United States Patent [19]

Harwood et al.

[11] 4,186,999
[45] Feb. 5, 1980

[54] CONNECTOR FERRULE FOR TERMINATING OPTICAL FIBER CABLES

[75] Inventors: Robert G. Harwood, Mechanicsburg; Terry P. Bowen, Etters, both of Pa.

[73] Assignee: AMP Incorporated, Harrisburg, Pa.

[21] Appl. No.: 844,869

[22] Filed: Oct. 25, 1977

[51] Int. Cl.² .............................................. G02B 5/14
[52] U.S. Cl. .............................. 350/96.21; 350/96.20
[58] Field of Search ............... 350/96.20, 96.21, 96.22

[56] References Cited

U.S. PATENT DOCUMENTS

| 3,455,625 | 7/1969 | Brumley et al. | 350/96.22 |
| 3,861,781 | 1/1975 | Hasegawa et al. | 350/96.21 |
| 3,897,134 | 7/1975 | Scrivo et al. | 350/96.22 |
| 3,904,269 | 9/1975 | Lebduska et al. | 350/96.22 |
| 3,914,015 | 10/1975 | McCartney | 350/96.22 |
| 3,990,779 | 11/1976 | McCartney | 350/96.21 |
| 3,999,837 | 12/1976 | Bowen et al. | 350/96.21 |
| 4,087,158 | 5/1978 | Lewis et al. | 350/96.21 |

*Primary Examiner*—Stewart J. Levy
*Attorney, Agent, or Firm*—Gerald K. Kita; Russell J. Egan

[57] ABSTRACT

An improved ferrule is disclosed for use in connectors terminating cables including at least one optical fiber. The ferrule is made, at least in part, from materials having an index of refraction approximating that of the cladding on the optical fiber of the cable, which cladding must be removed in order to assure precision location for maximum effective termination. The material of the ferrule and/or the adhesives used therewith will simulate the removed cladding to contain the light passing through the fiber thereby enhancing the fiber connection.

16 Claims, 4 Drawing Figures

4,186,999

CONNECTOR FERRULE FOR TERMINATING OPTICAL FIBER CABLES

BACKGROUND OF THE INVENTION

1. The Field of the Invention

The present invention relates to fiber optics connectors and in particular to a ferrule portion of a connector, which ferrule has physical properties compensating for cladding which must be removed from the fiber to effect precision location of the fiber for maximum effective termination.

2. The Prior Art

The present invention constitutes an improvement in fiber optics connectors of the type disclosed in U.S. Pat. No. 3,999,837, the disclosure of which is incorporated herein by reference. The connector described in this patent has been well received and is quite effective in terminating both plastic and glass fibers formed into single or multiple fiber cables. The present invention constitutes an improvement over the connector disclosed in the cited patent by constructing at least a portion of the ferrule member of materials having an index of refraction approximating that of the cladding which must be removed from the fiber in order to effect precision location for maximum effective termination of some types of optical fibers.

The known optical fibers are drawn from glass or plastics materials in conventional fashion. They are then coated with a cladding material having an index of refraction selected to contain the light rays passing through the fiber within the fiber itself. The known methods for applying this cladding material do not result in a layer of cladding which is uniform and concentric with the fiber itself. Therefore, in order to effect precision termination of the fiber, the cladding towards the ends of the fibers must be removed in order for the termination means to act directly on the fiber for precision locating. Removal of this cladding layer has an adverse effect on the overall optical properties of the fiber cable. The present invention minimizes this effect.

SUMMARY OF THE PRESENT INVENTION

The present invention constitutes an improvement in the art of fiber optics termination by forming at least a part of the termination means from a material having an index of refraction approximating that of cladding material removed from the fiber to effect precision termination by acting directly on the fiber. A ferrule member and/or an insert in a fiber receiving bore of the ferrule member are formed of material having an index of refraction approximating that of cladding removed from the fiber. The stripped fiber is inserted into a bore in the ferrule and/or insert and can be secured therein by a transparent adhesive material likewise having an index of refraction compatible to that of the stripped cladding and/or the fiber core.

It is therefore an object of the present invention to improve the previously known fiber optics connectors by forming at least a portion of a ferrule member of a material having an index of refraction approximating that of cladding removed from the fiber to effect precision termination.

It is another object of the present invention to form the ferrule of a known fiber optics connector of materials which have an index of refraction substantially replacing that of cladding removed from the fiber, and to secure therein a fiber of an optical fiber cable with adhesives having requisite strength, set up and ease of use characteristics.

It is a further object of the present invention to improve over known fiber optics connectors to allow use of adhesives having an index of refraction compatible with the cladding of the subject fiber but which adhesives have strength, set up time and ease of handling characteristics which are more desirable than those of adhesives which merely have a compatible index of refraction.

It is a still further object of the present invention to produce an improved fiber optics connector which can be readily and economically manufactured.

The means for accomplishing the foregoing objects and other advantages, which will be apparent to those skilled in the art, are set forth in the following detailed description taken with reference to the accompanying drawings.

DETAILED DESCRIPTION OF THE PREFERRED EMBODIMENTS

Figure 1:
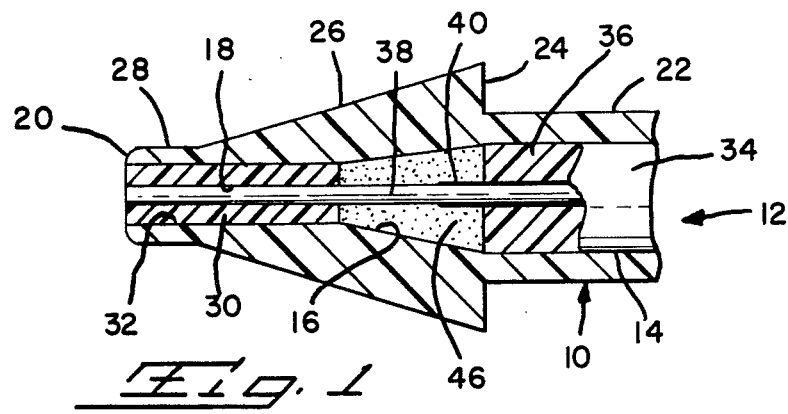
FIG. 1 is a longitudinal section through a nose portion of a ferrule member formed in accordance with the present invention.
Figure 2:
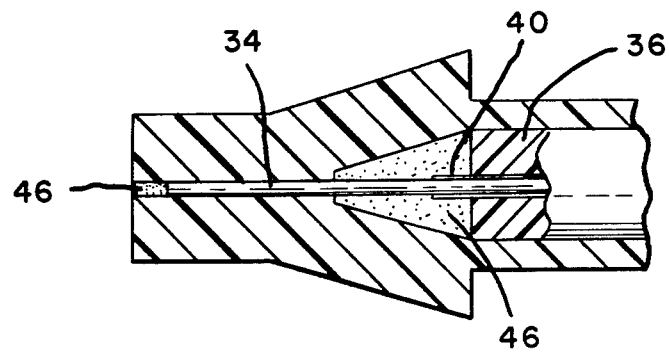
FIG. 2 is a longitudinal section through a nose portion of a ferrule member formed in accordance with an alternate embodiment of the present invention.

FIGS. 1 and 2 show the nose portion of a ferrule member 10 of the general type noted by reference numeral 18 in U.S. Pat. No. 3,999,837. The ferrule member 10 is an integral body of plastics material having a profiled axial bore 12 including at least a cylindrical cable receiving section 14, a truncated conical section 16 and a fiber receiving bore 18 opening onto a mating end face 20. The profiled exterior of the ferrule includes a cylindrical rear section 22, an outwardly directed annular shoulder or flange 24, a truncated conical lead portion 26 and substantially cylindrical nose portion 28 terminating at end face 20. In the embodiment of FIG. 1, the fiber bore 18 is formed in an insert 30 fixedly positioned in a larger bore 32 extending between cavity 16 and face 20.

The fiber optic cable 34 illustrated is of known type and includes jacketing material 36 surrounding a fiber 38 which is normally coated with a cladding material 40 having an index of refraction compatible with that of the fiber.

In order to effect precision termination of the optical fiber cable 34, it is necessary to strip both the jacketing layer 36 and the cladding 40 to physically engage the fiber itself thereby avoiding the previously discussed dimensioning problems. Removal of the cladding has an adverse effect on the optical properties of the fiber. The present invention overcomes this adverse effect by forming either the insert 30 (FIG. 1) or the entire ferrule member 10 (FIG. 2) of a material having an index of refraction approximating that of the removed cladding. For example, a fused silica (silicon dioxide) fiber is generally clad with a layer of optical plastic, such as silicone rubber. Either the ferrule member 10 or the insert 30 could be made of like optical plastic material, such as silicone rubber, and effectively substitute for the cladding removed from the fiber.

It should be noted that the fiber receiving bore 18, due to its small dimensions, is preferably drilled in the nose of the molded ferrule member 10 or assembly of the ferrule member 10 and insert 30. This drilling can be accomplished by conventional and/or laser drilling means. Further accuracy of the bore can be assured by rotating the ferrule member about its longitudinal axis during the drilling operation.

Figure 3:
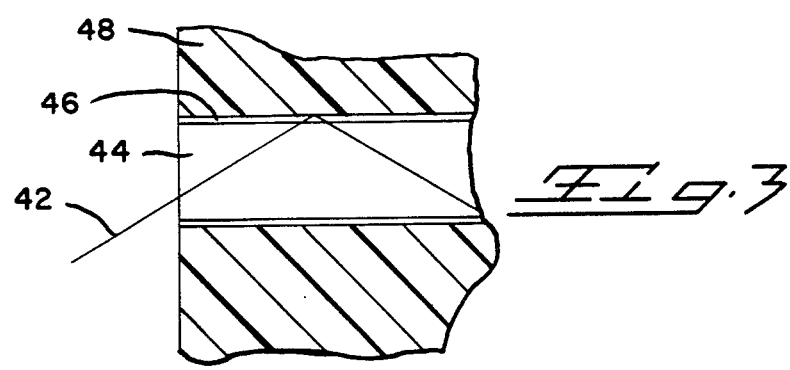
FIG. 3 is a diagrammatic sectional view illustrating the operation of the present invention.

FIG. 3 shows how a ray of light 42 passing through fiber 44 will encounter a change in the index of refraction either at the interface with an adhesive 46 or the borewall of the ferrule member or insert 48 and be refracted down the fiber rather than escaping.

Figure 4:
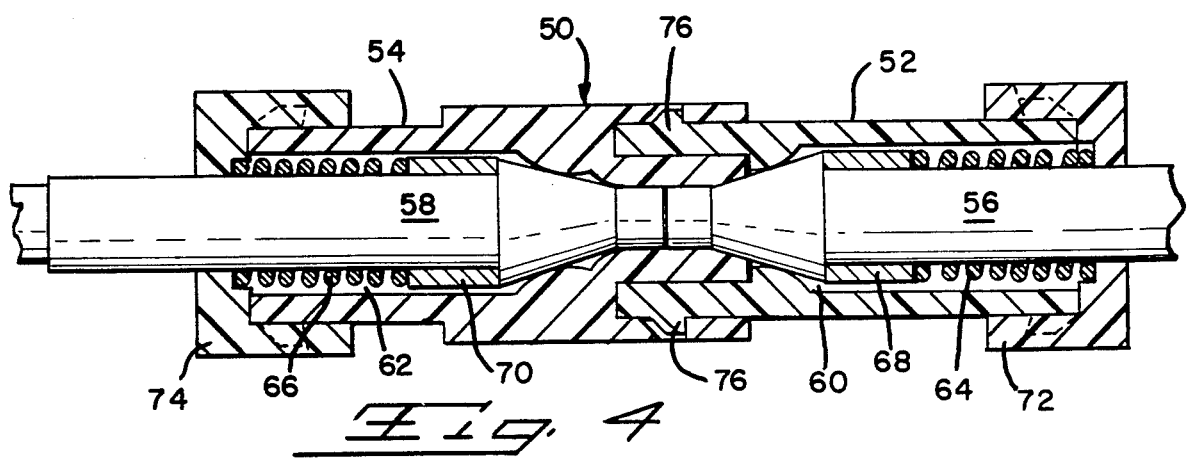
FIG. 4 is a longitudinal section taken through a known fiber optics connector incorporating the subject invention therein.

FIG. 4 shows a known fiber optics connector 50 employing the present invention. The connector includes mating plug and receptacle members 52, 54, respectively, each having a ferrule member 56, 58 mounted in a cavity 60, 62 and biased to a near abutting, aligned position by spring members 64, 66, sleeves 68, 70 and covers 72, 74. The mating members are also provided with latching means 76.

The embodiment of FIG. 2 further illustrates alternative mounting methods which may be employed with the subject invention. Namely, the fiber 34 can be broken and roughly positioned inside the bore 18 of the ferrule. Adhesive 46 is applied to bond the fiber in place as well as to fill in the conical section 16 and the end of the bore 18. The adhesive is a transparent material having an index of refraction approximating that of the fiber core 34. The nose of the ferrule is then polished to the desired length. This method has several advantages including: a break technique can be used to prepare the end of the fiber; only rough positioning of the break face with respect to the end face of the ferrule is required; adhesives having an index of refraction matching the fiber core index are readily available and these adhesives have other desirable characteristics such as set time, scuff resistance, etc. Also, the faces of the ferrules thus formed can be butted up against each other without the fibers making direct physical contact and possibly damaging one another by chipping or cracking. The fibers are totally encased to be protected from mechanical abuse or environmental attack. The types of adhesives used are not subject to growth of films or change in optical characteristics as may be the case for a broken fiber face.

By proper selection of the index of the ferrule and/or insert material and the index of the adhesive material, the numerical aperture at the launch or receive end of the fiber may be altered in a controlled fashion. For example, a large numerical aperture might by selected for the launch end and a small numerical aperture for the exit. Thus coupling efficiency could be increased. This would also allow for purposely introducing tapers or special shapes if desired to enlarge the effective size of the core or to match the shape of the emitting area of the source. For example, edge emitters are thin and long rectangular shapes while the fiber is round. A horn shaped taper could be provided by molding, multiple drilling, or other known shaping techniques, to form the desired mating configuration. Selection of adhesive materials would provide the desired coupling.

The present invention may be subject to many modifications and changes without departing from the spirit or essential characteristics thereof. The present embodiments should therefor by considered in all respects as illustrative and not restrictive of the scope of the invention.

What is claimed is:

1. An improved ferrule member for a fiber optics cable connector, each connector having a housing member with at least one ferrule receiving cavity therein and means to secure a ferrule member in each said cavity, said ferrule member comprising:
    a body having a profiled passage extending therethrough from a cable receiving rear portion to a bore of sufficient size to allow only the passage of an unclad optical fiber core therethrough,
    an optic cable having a light transmitting core projecting from a light refracting cladding,
    at least that portion of the ferrule body defining said passage being formed of a material having an index of refraction approximating that of said cladding and snuggly encircling said projecting core inserted in said passage.

2. An improved ferrule member according to claim 1 wherein said material having an index of refraction approximating that of said cladding is an optical plastic.

3. An improved ferrule member according to claim 1 wherein:
    the entire ferrule body is formed of a material having an index of refraction approximating that of said cladding.

4. An improved ferrule member according to claim 1 wherein:
    said ferrule member has fixed therein an insert of material having an index of refraction approximating that of said cladding, said fiber bore lying within said insert.

5. An improved ferrule member according to claim 1 wherein:
    said cladding and said portion of the ferrule member having a like index of refraction are silicone rubber.

6. A method for terminating single fiber optical cable with a high degree of positional accuracy and light coupling comprising the steps of:
    stripping shielding and cladding layers from an end of an optical fiber cable to be terminated;
    inserting said fiber into a bore formed in material having an index of refraction approximating that of said cladding; and
    securing said fiber in said bore by application of a transparent adhesive having an index of refraction approximating that of said fiber.

7. In a ferrule connection for an optical waveguide of the type having a light transmitting core encircled by a layer of cladding, the ferrule being capable of controlling or altering the numerical aperture at the launch end or receive end of the core and characterized by a profiled passage-way extending axially through said ferrule and receiving said waveguide into a first end of said ferrule, the improvement comprising:
    a portion of said core protruding from the remainder of said waveguide and projecting along said passageway with its launch end or receive end toward a mating second end of said ferrule,
    adhesive material having an index of refraction approaching that of said core encircling and bonding said protruding portion of said core to said ferrule, and
    at least a portion of said ferrule encircling said protruding portion of said core having an index of refraction less than that of said adhesive.

8. The structure as recited in claim 7, wherein, said portion of said ferrule defining said profiled passageway comprises an insert of a material having an index of refraction approaching that of said cladding.

9. The structure as recited in claim 7, wherein, said fiber is fused silica.

10. The structure as recited in claim 7, wherein, said cladding is plastic.

11. The structure as recited in claim 7, wherein, said portion of the ferrule member is silicone rubber.

12. The structure as recited in claim 7, wherein, said profiled passageway flares conically toward said first end of said ferrule.

13. The structure as recited in claim 7, wherein, a terminal end of said protruding portion of said core lies within said profiled passageway adjacent said ferrule second end, and
said adhesive material is bonded to said terminal end and fills the profiled passageway from said terminal end toward said ferrule second end.

14. The structure as recited in claim 7, wherein, a terminal end of said protruding portion of said core is flush with said ferrule second end.

15. The ferrule connection as recited in claim 7, and further including:
a connector housing having at least one ferrule receiving cavity communicating with a mating face of said housing, and
means securing said ferrule with limited axial movement in said cavity, and with said ferrule second end projecting toward said mating face.

16. An improved ferrule member for a fiber optics cable connector, each connector having a housing member with at least one ferrule receiving cavity therein and means to secure a ferrule member in each said cavity, said ferrule member comprising:
a body having a profiled passage extending therethrough from a cable receiving rear portion to a bore of sufficient size to allow only the passage of an unclad portion of an optical fiber core therethrough, at least that portion of the ferrule body defining said passage being formed of a material having an index of refraction approximating that of cladding covering said core,
said small bore being formed by laser drilling out a molded blind bore in said ferrule.

* * * * *